Sept. 3, 1935.  W. N. GILBERT ET AL  2,013,539
SCALE DEVICE
Filed July 24, 1930  2 Sheets-Sheet 1
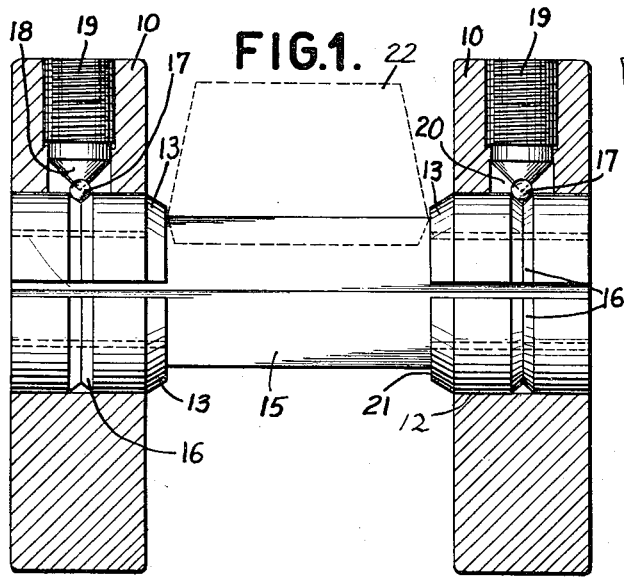
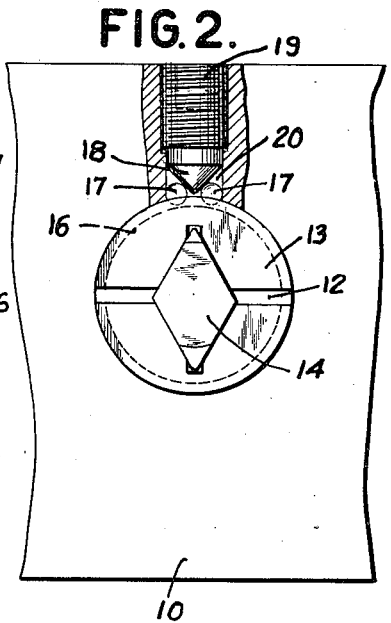
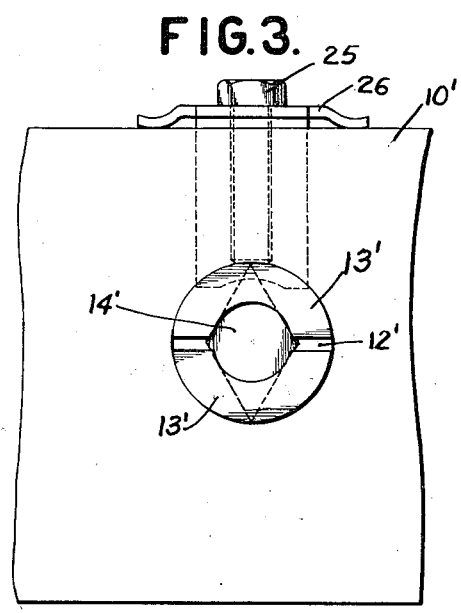
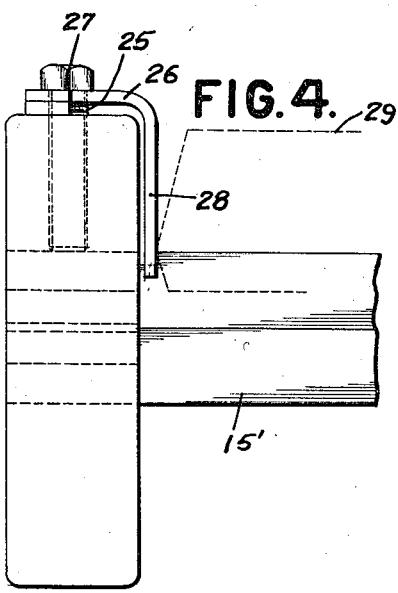

Sept. 3, 1935.  W. N. GILBERT ET AL  2,013,539
SCALE DEVICE
Filed July 24, 1930    2 Sheets-Sheet 2
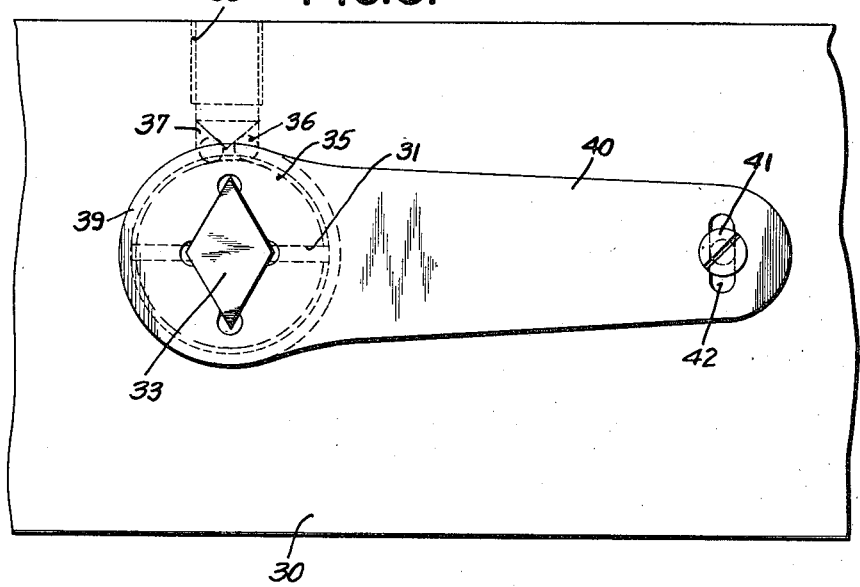
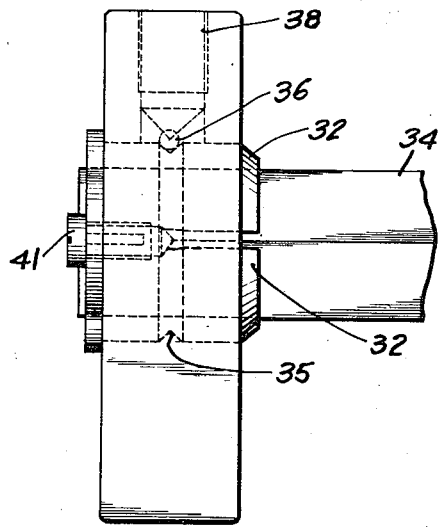
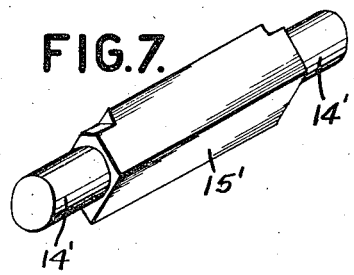
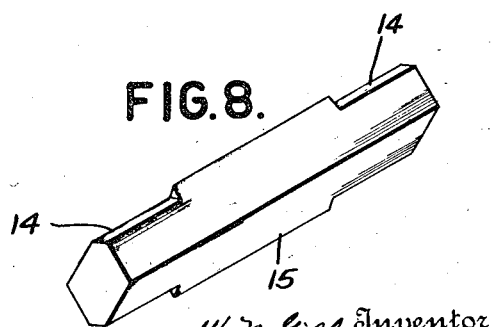

Patented Sept. 3, 1935

2,013,539

UNITED STATES PATENT OFFICE 2,013,539

SCALE DEVICE

William N. Gilbert, Hudson Heights, N. J., and William Gumprich, Binghamton, N. Y., assignors, by mesne assignments, to International Business Machines Corporation, New York, N. Y., a corporation of New York Application July 24, 1930, Serial No. 470,286

10 Claims. (Cl. 308—140)

This case relates to weighing scales and particularly to the bearing elements thereof.

The object of this invention is to provide a novel means for holding a pivot within a scale element.

More specifically an object of the invention is to provide a pivot construction in which retainer elements are provided for holding therein a pivot and which retainer elements are secured to a lever or the like by novel means.

Further and other objects and advantages will be hereinafter set forth in the accompanying specification and claims, and shown in the drawings, which by way of illustration show what is now considered to be the preferred embodiment of the invention.

In the drawings:

Fig. 1 is a section through the bifurcated portion of a lever showing the pivot in place;

Fig. 2 is a side view of Fig. 1 with portions in section:

Fig. 3 is a side view of a modification;

Fig. 4 is an end view of Fig. 3;

Fig. 5 is a side view of another modification;

Fig. 6 is an elevation of the modification shown in Fig. 5;

Fig. 7 is the pivot element shown in Fig. 3; and

Fig. 8 is the pivot element shown in Fig. 1.

Referring to Figs. 1, 2 and 8, each furcation 10 of the scale lever is provided with a round bore 12 in which are seated two semi-circular retainer elements 13 having grooves facing each other for receiving the diamond-shaped end 14 of the knife edge pivot 15. Each retainer element 13 has a V-shaped groove 16 therein. In the groove of the upper retainer 13 is seated a pair of steel balls 17 wedged apart by the conically pointed end 18 of a screw 19. The screw 19 is threaded within a bore 20 of the lever furcation. As the screw is moved downward the conically pointed end 18 forces the balls 17 apart and into engagement with the opposite walls of the bore 20. In so doing the balls are also wedged tightly against the walls of the groove 16 of the upper pivot retainer element 13 which is thereby forced towards the lower element 13 to clamp the pivot end 14 tightly against movement relative to the lever furcations. The assembly consisting of retainer elements 13 and knife edge pivot 15 is thus tightly although adjustably fixed to the lever furcations 10. The retainer elements 13 in addition to clamping the pivot ends 14 therein have their inner vertical faces 21 serving as end thrust bearings for resisting endwise movement of the V-shaped block 22 seated on the knife edge pivot 15.

Referring to the modification shown in Figs. 3, 4 and 7, furcations 10' are also provided with round bores 12' in which are seated the semi-circular retaining elements 13' but in this modification the facing grooves of the pivot retainers are semi-circular and concentric with the outer circumference of the retainer elements. Within these grooves is seated the round end 14' of the knife edge 15'.

In order to clamp the pivot ends 14' within the retainer elements 13' and to secure the retainer elements also against movement relative to the lever furcation, the latter is provided with a threaded bore within which is movable the screw 25, the end of which bears against the upper retainer element 13' and locks it in position while at the same time forcing it towards the lower retainer element to clamp the pivot end 14' therebetween. The head 27 of screw 25 serves to clamp a thrust plate 26 in position, of which the vertical face 28 resists endwise movement of the V-shaped block 29 mounted on knife edge 15'.

Referring to the modification in Figs. 5 and 6, the lever furcation 30 is provided with a round bore 31 in which are seated the retainer elements 32 for clamping between them the diamond-shaped end 33 of the pivot 34. Each retainer element 32 is provided with a groove 35 in which are seated the balls 36 wedged tightly between the upper retainer element and the walls of a groove 37 in the lever furcation by means of a conically pointed screw 38 threaded within said groove 37. In order further to hold said pivot 34 in adjusted position and to provide a simple means for making fine adjustments of the pivot the diamond-shaped end 33 of the pivot projects beyond the side of the furcation 30 and is seated within the diamond-shaped hole formed in the end 39 of a member 40, the other end of which is secured to the side of the furcation by means of a screw 41, the head of which passes through a slot 42 in the member 40. By loosening the screw 41 the member 40 may be given a movement limited by the length of slot 42 about the axis of the pivot 34 to rotate the latter together with the pivot retainers 32 within the bore 31 of the furcation 30.

While we have shown and described the several particular modifications of the invention, it is understood that they are merely illustrative of the invention and therefore we desire to be limited only by the scope of the following claims:

1. The combination with a lever having a socket therein, of a pivot, a retainer insertable into said socket and having an internal seat to receive the pivot therein and space the pivot at all points from the walls of said socket, the retainer being preliminarily, rotatably, adjustable within said socket and a device separate from the retainer for clamping the retainer and pivot against movement relative to the lever and including an element immovably wedged directly between a part of the lever and a part of the retainer periphery to prevent rotation of the retainer from its adjusted position within said socket.

2. In the combination as defined in claim 1, said lever having a bore extending angularly to and intersecting the socket and said device also including a screw threaded into said bore and engaged at its lower end with said element to hold the latter in wedging coaction with the aforesaid part of the lever and the aforesaid part of the retainer periphery, the screw being adjustable along said bore to vary the force with which it is holding said element in wedging coaction with aforesaid parts.

3. The combination with a support having a socket therein, of a diamond-shaped pivot with the intersection of a pair of adjacent facets forming a linear, knife edge bearing for rockable coaction with a scale pivot, a retainer device insertable into said socket and comprising a plurality of separate pieces each having a V-groove, the grooves facing each other to form a diamond-shaped seat within which the pivot may be clamped against rotation relative to the retainer device and by which the pivot is held spaced away at all points from the walls of said socket, and means adjustably carried by said support for movement relative to the retainer device for forcing the pieces together to simultaneously clamp them to the support and to the pivot against relative movement.

4. The combination with a support having a round socket, of a knife edge pivot, a trunnion for the pivot comprising a retainer device for receiving the pivot and having a round periphery engaged with the socket walls of said support, said support having a bore intersecting the socket and extending angularly thereto, a plurality of round elements in said bore for engaging the periphery of the retainer device, and a screw threaded into the bore to force the elements towards and firmly against the periphery of the retainer device and against opposite sides of said bore to lock the retainer device and pivot against movement relative to the support.

5. The combination with a lever member having a socket, of a knife edge pivot, a plurality of separate retainer elements spaced with respect to each other about the periphery of the socket for receiving the pivot, each element engaging a different side of the pivot and spacing it completely away from the walls of said socket, and a wedging device movably carried by said member including means wedged between the member and the periphery of one of the retainer elements for clamping the retainer elements and pivot to the support.

6. The combination as defined in claim 5, said socket having arcuate walls, said retainer elements having arcuate peripheries for rotatably engaging said socket walls, said elements each having a V-groove, the grooves facing each other to form a diamond-shaped seat, said pivot being diamond-shaped to non-rotatably fit in said seat, and said wedging device moving the elements radially towards each other to clamp the pivot therebetween.

7. In a scale, a lever having a round hole, a scale pivot having a V-shaped bearing portion a retainer device therefor fitted within the hole and comprising a pair of separate and substantially semi-circular retainer pieces, each piece having its diametrical chord interrupted intermediately by a groove, the grooves facing each other to form a seat for receiving the pivot, and a device separate from the pivot, retainer pieces and lever adjustable on said lever for securing the retainer pieces against rotation in said socket while simultaneously forcing the retainer grooves and the confronting edges of the chords at opposite sides of each groove towards each other to clamp the pivot with substantially equal pressure on all sides thereof.

8. In a scale, a lever having a round hole, a V-edge pivot having a diamond-shaped end, a trunnion therefor fitted within the hole and comprising a pair of substantially semi-circular retainer pieces, each piece having its diametrical chord interrupted intermediately by a V-groove, the grooves facing each other to form a diamond-shaped seat for receiving the diamond-shaped end of said pivot, and a device adjustable relative to the lever, pivot, and trunnion for engaging the trunnion to secure it against rotation in the socket while simultaneously forcing the retainer grooves and the confronting edges of the chords at either side of each groove towards each other to clamp the pivot with substantially equal pressure on all sides thereof.

9. In a scale, a lever having a round hole and angularly thereto a threaded bore communicating with the hole, a knife edge pivot, a round retainer device therefor fitted within the hole and comprising a pair of substantially semi-circular retainer pieces, each having its diametrical chord interrupted intermediately by a groove, the grooves facing each other to form a seat for receiving the knife edge pivot, a screw threaded in said bore and having a wedge end and a pair of round elements between the wedge end, the walls of the bore, and the periphery of the retainer device and upon adjustment of the screw forced apart and wedged between the wedge end of the screw, opposite walls of the bore, and the arcuate periphery of one of the retainer pieces to secure the retainer device against rotation relative to the lever and exerting an equal pressure at opposite sides of the wedge end for forcing the retainer grooves and the confronting edges of the chords at each side of the grooves towards each other to clamp the pivot with substantially equal pressure on all sides.

10. In a scale, a lever having a round hole and angularly thereto a threaded bore communicating with the hole, a knife edge pivot, a round trunnion therefor fitted within the hole and comprising a pair of substantially semi-circular retainer pieces, each having a peripherally extending recess, each having its diametrical chord interrupted intermediately by a groove, the grooves facing each other to form a seat for receiving the knife edge pivot, a screw threaded in said bore and having a wedge end and a pair of round elements seated within said recess and between the wedge end, the walls of the bore, and the periphery of the trunnion and upon adjustment of the screw forced apart and wedged between the wedge end of the screw, opposite walls of the bore, and the arcuate periphery of one of the retainer pieces to secure the trunnion against rotation relative the lever and exerting an equal pressure at opposite sides of the wedge end for forcing the retainer grooves and the confronting edges of the chords at each side of the grooves towards each other to clamp the pivot with substantially equal pressure on all sides, the anti-friction elements also seating within said retainer recess to fix the longitudinal position of the trunnion and knife edge.

WILLIAM N. GILBERT.
WILLIAM GUMPRICH.